Jan. 6, 1931.    C. H. WILD    1,787,739
MOTOR DRIVE FOR CASE FILLING MACHINES
Filed July 3, 1928    5 Sheets-Sheet 5
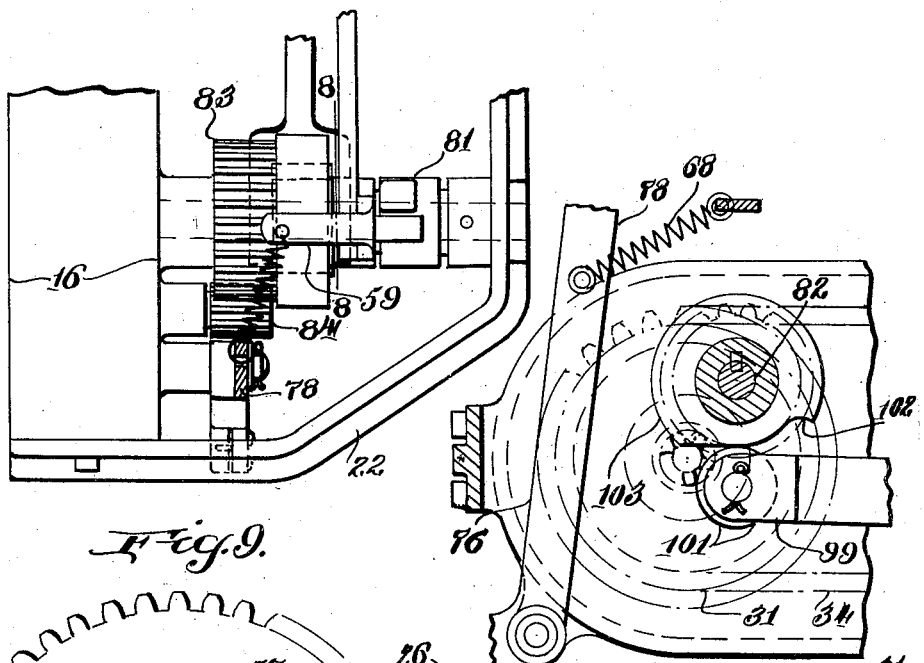
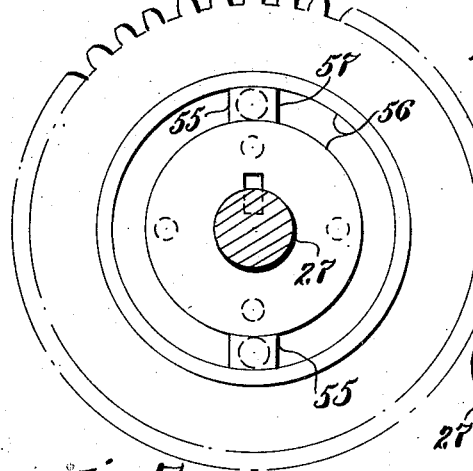
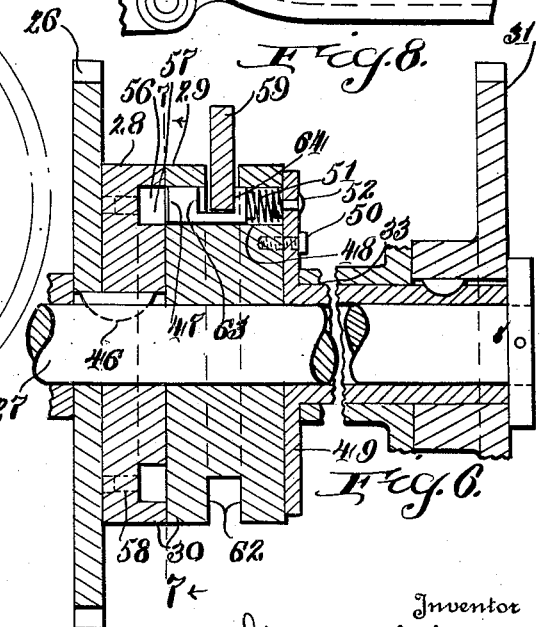

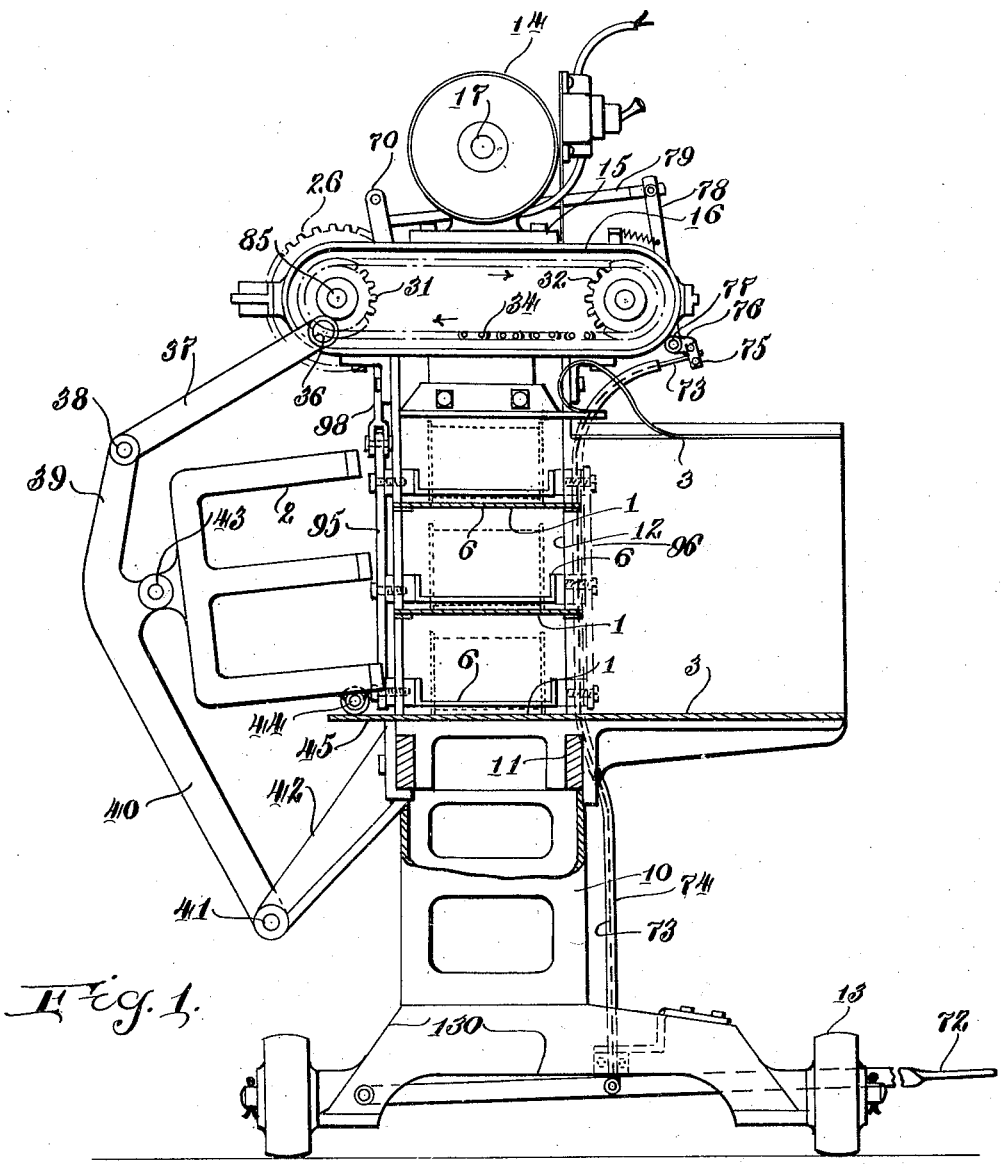

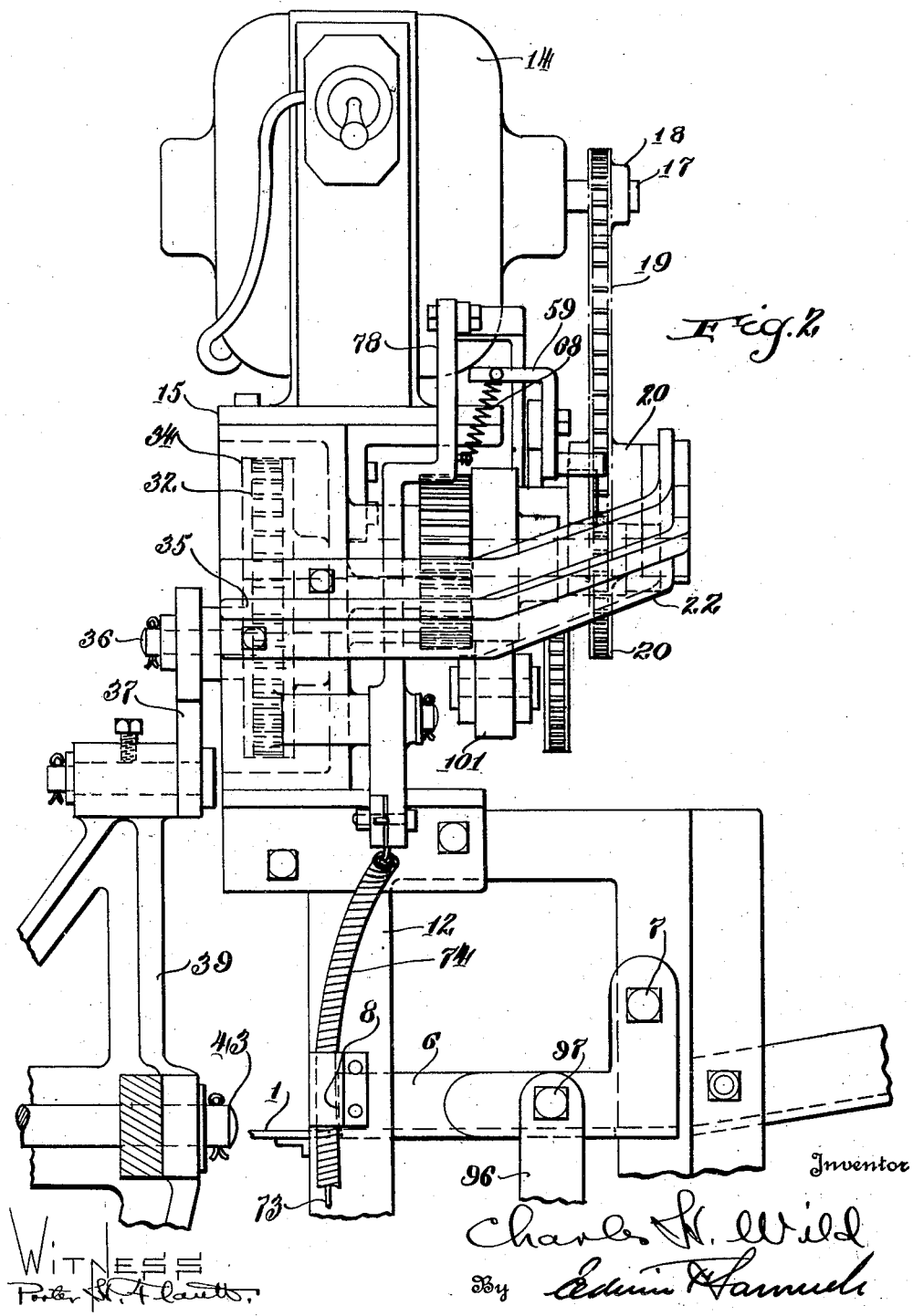

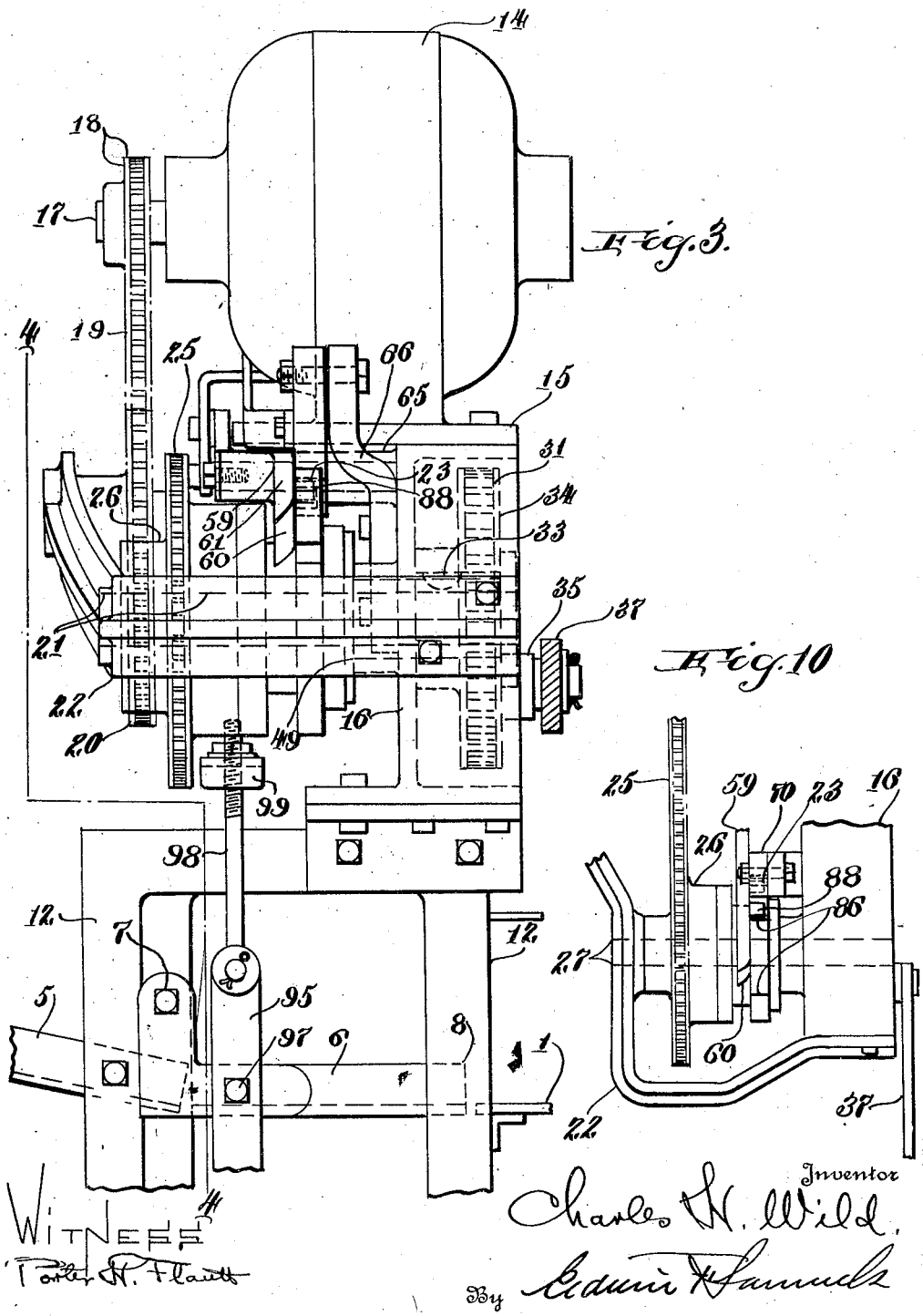

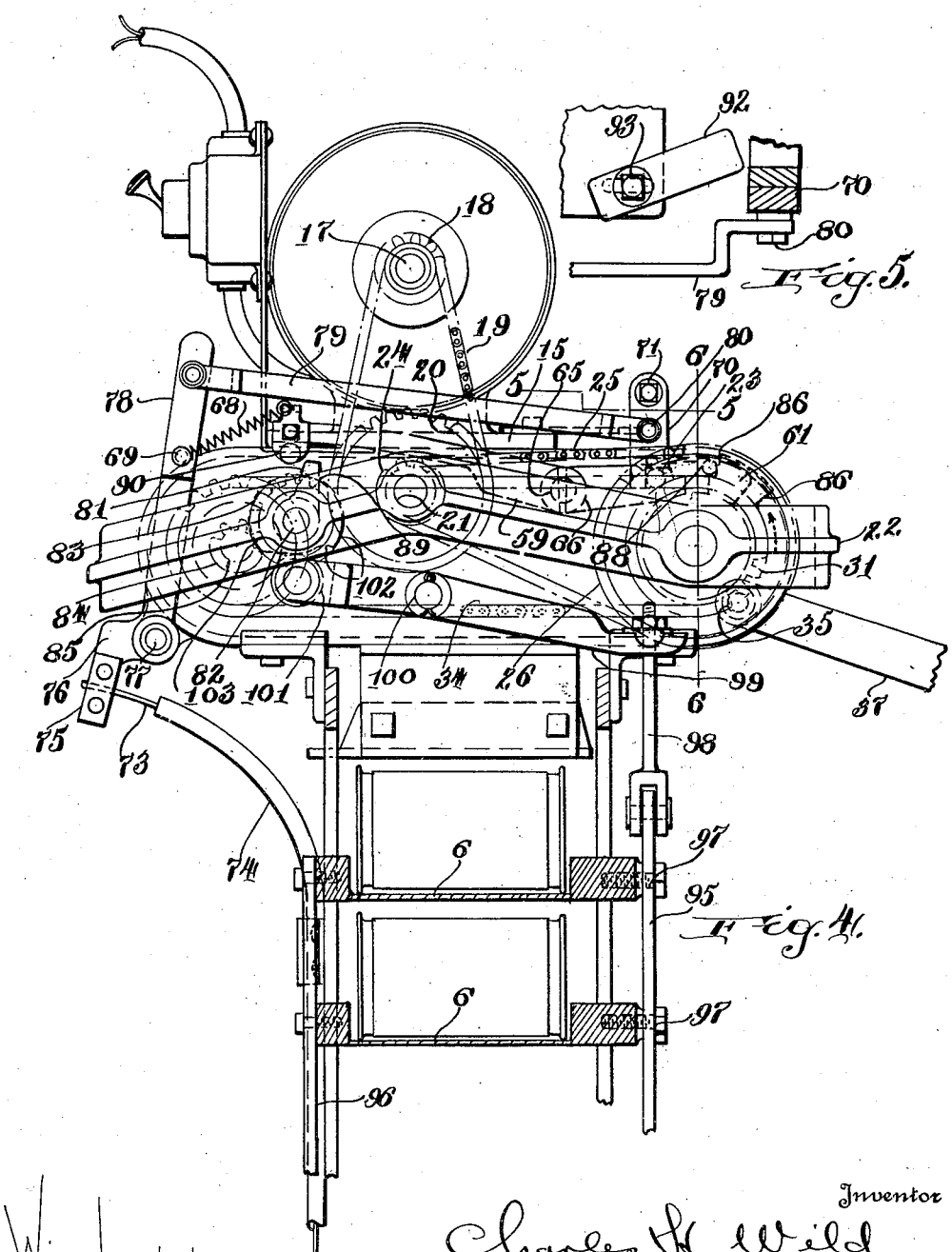

Patented Jan. 6, 1931

1,787,739

UNITED STATES PATENT OFFICE

CHARLES H. WILD, OF BALTIMORE, MARYLAND, ASSIGNOR TO BURT MACHINE COMPANY, INCORPORATED, OF BALTIMORE, MARYLAND, A CORPORATION OF MARYLAND

MOTOR DRIVE FOR CASE-FILLING MACHINES

Application filed July 3, 1928. Serial No. 290,239.

The invention relates to the class of machines which consist of a shelf or series of shelves by which cans or packages are assembled to form a load and then moved by means of a plunger into a case or carton, which is held in alignment with the load forming mechanism to receive the same.

In the previous practice the plunger has been, in the majority of instances, actuated by foot power which is found to be comparatively slow, irregular and uncertain, particularly where the cases are of large capacity and the loads of correspondingly considerable magnitude or weight.

The present invention relates to the application to such machines of means for operating the plunger from a central source of power. As the most convenient means of distributing power under the present conditions is by electricity which is transformed into mechanical motion by a relatively high speed rotary motor, the machine, as shown, is equipped with such a motor and the mechanism which is the subject of the invention is adapted to transform high speed rotary motion from an electric motor, or other source, into the comparatively slow periodic reciprocating motion which is required to actuate the plunger.

While the high speed rotary motion, in the form of the invention shown, is produced by means of an electric motor, any other source of rotary motion may be utilized within the scope of the invention.

In the accompanying drawings I have illustrated so much of a case filling machine to which the device of the invention in the preferred form has been applied, as is necessary to a full comprehension of the same and the manner of constructing, operating and using it.

In the drawings:

Figure 1 is an elevation of the machine taken from the left of the operator, the upper portion of the machine being broken away to show the arrangement of the shelves and the funnel.

Figure 2 is a view on an enlarged scale of the upper portion of the machine looking from the right in Figure 1.

Figure 3 is a view on the same scale as Figure 2 looking from the left in Figure 1.

Figure 4 is a view on the same scale as Figures 2 and 3, looking at the machine in a direction opposite to that from which it is seen in Figure 1, the view being taken from the line 4—4 of Figure 3 and some of the parts being sectioned on this line.

Figure 5 is a fragmentary section on the line 5—5 of Figure 4, showing a detail.

Figure 6 is a section on the line 6—6 of Figure 4.

Figure 7 is a section on the line 7—7 in Figure 6 looking to the left in said figure.

Figure 8 is a fragmentary view showing the sprockets at the extreme left in Figure 4, taken from the line 8—8, Figure 9, looking to the left.

Figure 9 is a fragmentary plan view showing the part nearest the observer in Figure 2, i. e., at the left in Figure 4.

Figure 10 is a fragmentary plan showing the portion of the machine nearest the observer in Figure 3, i. e., at the right in Figure 4.

The machine which is the subject of the invention is of the type known as a case filling machine, being used for filling cartons with cans or cylindrical packages. A machine of this type is illustrated in my prior Patent No. 1,619,839.

The invention relates to the manner of connecting a relatively high speed rotary driving member, as an electric motor, to the machine to operate the same, and certain modifications of the mechanism whereby it is adapted to the electric drive.

The machine, described in general terms, consists of a horizontal shelf or, more particularly, in the present instance of a plurality of vertically spaced horizontal shelves 1 which are so arranged as to receive and support a number of cans corresponding to the contents of the carton or case to be filled. This accumulation of cans is supported in the path of a reciprocating plunger 2, which is a feature of all such machines.

On the other side of the shelves 1, which serves the function of a load forming mechanism, is the funnel 3 at the mouth of which the cartons or boxes are placed to receive the load.

The cans are led to the shelves down inclined runways or chutes 5, shown fragmentarily in Figures 2 and 3. The motion of the cans on the runways is checked and the cans on the runways are separated from the completed load in front of the plunger by means of gates 6, which are shown in side elevation in Figures 2 and 3, in section in Figure 4 and in front elevation in Figure 1. These gates are pivotally mounted at 7 on the frame and their forward ends 8 are swung upwardly, by means to be described, before each motion of the plunger and after the completion of the load to separate the cans on the ways, as aforesaid, from the cans composing the load, permitting the load to move freely from the shelves through the funnel into the carton or case.

The various elements of the machine are supported on and secured to a frame consisting of a column 10, longitudinal beams 11 and uprights 12. This frame has a base 130 which may be supported on rollers 13 or in any suitable manner.

In accordance with the invention in the preferred form, an electric motor 14 having a base 15 is mounted in any suitable manner on the upper portion of the machine. In the form of the invention shown, the base 15 is bolted to the gear casing 16 which, in turn, is secured to the upright portion of the frame 12.

The motor 14 is provided with a motor shaft 17 on the end of which is mounted a sprocket 18 secured to the shaft to rotate therewith. This sprocket drives a chain 19 which, in turn, meshes with and drives a toothed sprocket 20 mounted on and secured to a shaft 21 which has suitable bearings in the superstructure 22 secured to the gear casing 16. A sprocket 24 is secured to this shaft to rotate with sprocket 20. The sprocket 24, in turn, drives a chain 25 which meshes with a toothed sprocket 26, see particularly Figures 4, 6 and 10, which sprocket 26 is secured to a shaft 27 rotating in suitable bearings in the machine.

This shaft 27, in turn, carries the constantly rotating member 28 and the intermittently rotating member 29 of the periodic clutch 30, Figure 6, to be described.

The intermittently moving clutch member 29 carries a tubular member or a hollow shaft 33 rotating on shaft 27 to which shaft 33 is secured a sprocket 31, see Figures 1, 3 and 4, which sprocket drives the connecting rod chain 34, see Figures 1 and 4. This chain 34 passes forwardly over the idler sprocket 32.

The chain 34 carries a special link 35, to which link 35 is secured a connecting rod pin 36 on which is pivotally mounted the connecting rod 37 which actuates the plunger 2 in a manner to be described.

In the form of the invention shown, the connecting rod 37 is pivotally connected at 38, Figure 1, to an upwardly projecting arm 39 of the plunger lever 40, which is pivotally mounted at its lower end at 41 on a bracket 42 secured to the frame. To this arm 40 the plunger 2 is connected intermediately of its length by means of a pin 43, the plunger being supported by means of a roller 44 which rides on the lower shelves or floor 45 of the machine.

It will be understood that as the chain 34 is driven by the sprocket 31 over the sprocket 32 and from one sprocket to the other, the pin 36 will follow the path indicated by the contour of the chain 34, Figure 1. The plunger will thus be reciprocated, performing a complete forward and return stroke each time the pin 36 traverses the entire path indicated, returning to the position of rest in which it is shown in Figure 1, which is, in fact, the position of rest of the plunger 2 in which position it remains during the period of feeding, when the cans are fed to the shelves 1 and assembled thereon to form the load. However, the motion of the plunger is continuous throughout the traverse of the chain and in order to form the load in the path of the plunger, i. e., to feed the cans to the load forming shelves and assemble them thereon, a pause in the operation of the plunger is essential. In accordance with the preferred operation of the machine shown, it is tripped by the operator, performing one complete operation, when it stops, ready to be again tripped. During each operation a load is shifted into the carton and a new load formed.

This effect is accomplished by means of the periodic clutch 30. This clutch 30 consists of disks 28 and 29, the disks 28 being keyed to the shaft 27 and to the large sprocket 26 by means of a key 46. The disk 29 is, however, free to rotate on the shaft 27. The periodic engagement and disengagement of the clutch is accomplished by means of the sliding bolt 47 which is mounted in a hole or bore 48 in the disk 29 parallel to the axis. This hole is covered by the plate 49 secured to the disk by means of bolts 50, or in any suitable manner, and formed integrally with the sleeve or tube 33.

The bolt 47 is normally urged to the left in Figure 6 by means of a helical spring 51 seated in the bore or cavity 48 and bearing at one end against the plate 49 to which it is secured by means of a rivet 52, or in any suitable manner, the other end of the spring bearing against the corresponding end of the bolt 47.

The bolt 47 in its advanced position connects the periodically rotating disk 29 to the continuous rotating disk 28 for the periods of rotation of the disk 29. This connection of the disks is accomplished by contact of the bolt 47 with a suitable abutment or abutments 55 on the disk 28. In the form of the invention shown, the disk 28 is grooved at 56, the groove being circular and concentric with the axis, and blocks 57, of which there are two in the form of the invention shown diametrically opposite, are seated in the groove 56. These blocks in the construction illustrated, are held in position by pins 58 extending into the body of the disk 28 parallel to the axis of the shaft.

As already stated, the bolt 47 is actuated by a spring 51 which imparts to it a tendency to advance to the left in Figure 6 into the groove 56 and when the bolt is released, i. e., free to advance, its forward end projects into the groove and remains in this position until it is withdrawn.

The bolt 47 is controlled, timed and released, in the form of the invention shown, at the will of the operator in order that it may advance and connect the clutch members and be withdrawn at predetermined intervals to disconnect the clutch members by means of the timing lever 59. This lever 59, see particularly Figures 2, 3, 4 and 10, is provided at its operative end with an inclined wedge or cam surface 60 and the cam end 61 of the lever rides in a peripheral groove 62 in the disk 29, which groove intersects the bore 48 which carries the bolt 47. This bolt is also provided as shown in Figure 6, with a cam slot 63 providing a follower surface or abutment 64 at one side to engage and cooperate with the cam surface 60 of the lever 59. The lever 59, see particularly Figure 4, is pivotally mounted intermediately of its length on a stud 65 seated in the frame in a suitable boss 66 provided thereon.

A tendency to swing in left handed rotation about the pin 65 is imparted to the lever 59 in any suitable manner as by a spring 68 connected to the left hand end of the lever, as shown in Figure 4, and to a point 69 on lever 76 to be described, and the lever 59 is locked in position with its cam end in the groove 62 by means of a latch 70, Figure 4, which latch is pivotally mounted at 71 on a suitable stud in the frame.

This latch is swung about its pivot at the will of the operator to unlock and release the lever 59 by any suitable controlling member, as a foot pedal 72. The latch engages a pin 23 on the lever 59, Figure 1. The foot pedal is connected by a flexible wire, or any suitable connecting member 73, shown as contained in a tube 74, to the depending swinging end 75 of a bell crank lever 76 pivoted at 77 and having an upwardly extending arm 78. This arm is connected by means of a connecting rod 79, see Figures 1 and 4, to the pivoted latch 70 by means of a pivot pin 80.

The timing lever 59 is operated to release the bolt 47 by means of a cam 81 which, as shown, is mounted on and secured to a shaft 82 which is rotated by a gear 83, also secured to the shaft, the said gear 83 being driven by a pinion 84 on the shaft 85 which carries the driven or idler sprocket 31 which carries the chain 34. The timing mechanism also includes a stop 86 carried by the clutch member 29, see particularly Figure 4, which stop at the end of the stroke, i. e., at the end of each operation of the plunger 2, engages a pin 88 provided for this purpose on the lever 59, arresting the motion of the chain 34 and hence of the plunger in the predetermined withdrawn position.

To permit the chain to stop in the predetermined position, the sliding bolt 47 must be withdrawn by the action of the cam surface 60 on the cam end 61, see Figure 3, of the lever 59. This is accomplished by means of the cam 89, see Figure 4, which is secured to the shaft 82 and rotated by means of the gear 83, as already described. This cam 89 rotates right handed or clock-wise as seen in Figure 4 and in said figure is shown as having just passed the follower pin 90 on the left hand end of the lever 59, the machine being shown in the quiescent position with the plunger withdrawn, in which position the load forming or supporting shelves are being filled. This pin 90 is engaged by the cam when the latter has about completed a single revolution and the plunger is returning, raising the left hand end of the lever 59 which throws the right hand end into the groove 62 in the disk 29, where it is held by the latch 70, the same being moved to the right to engage the pin 23 on the lever 59 by means of the spring 68, which serves both to draw the left hand end of the lever 59 downwardly and the upper end of the lever 78 to the right in Figure 4. When the latch 70 has engaged the pin 23 it holds the cam end 61 with the cam surface 60 in the position shown in Figure 6 in which the bolt 47 is disengaged, i. e., withdrawn, until the foot is again placed on the pedal 72 causing the cycle of operations to be repeated.

Figure 5, which is a fragmentary section on the line 5—5 of Figure 4, shows an adjustable stop 92 for the latch lever 70, the stop 92 being held in any desired position of adjustment on the motor base 15 by means of a bolt 93. The latch 70 contacts the stop 92 in its extreme withdrawn position.

In addition to the actual operation of the plunger, an essential step in the transfer of each charge of cans or packages from shelves 1 to the carton is the separation of the cans on the ways shown fragmentarily at 5, Figures 2 and 3, from the load on the shelves 1, Figures 1, 2 and 3. This separation is accomplished, in the form of the invention shown, by means of gates 6 similar to those shown in my previous Patent No. 1,619,839, though any suitable type of separating means may be substituted within the scope of my invention.

The gates 6, as previously used, as well as in the operation of the machine illustrated, separate the cans on the ways from the load or charge formed on the shelves by swinging upwardly about the pivotal points 7 at which they are supported on the frame, it being understood that each gate 6 is in the form of a short section of way, the same being shown in cross section in Figure 4 and in side elevation in Figures 2 and 3, and also in end elevation in Figure 1.

These gates, as shown and described in the previous patent, there being one for each shelf, are connected together to be simultaneously operated by means of depending connecting rods 95 and 96, pivotally connected to each of the gates in any suitable manner, as by means of studs 97, the connecting rod 95 being further connected at its upper end by means of a rod 98 to the separator actuating lever 99.

This lever 99 is pivotally mounted intermediate of its length by means of a stud 100 on the frame, the opposite end of the lever from the rod 98 being provided with a cam roller 101, Figures 4 and 8, which engages the surface of a cam 102 which is mounted on the same shaft 82 which carries the cam 81 and the gear 83, which cam is timed to depress the roller 101 and the left hand end of the lever 99, raising the right hand end and the rod 98 with the connecting rod 95 and the gates 6, cutting off the load by separating the cans on the ways from the cans on the shelves just prior to the advance of the plunger.

As soon as the stroke of the plunger has been completed and the latter has returned to its withdrawn position, the raised portion 103 of the cam 102 passes the roller 101, the latter is permitted to rise, the gates 6 are lowered by their own weight, together with the cans or packages thereon, permitting a new charge to roll from the ways 5, Figures 2 and 3, onto the shelves 1, Figures 1, 2 and 3, when the machine is in position for the beginning of a new cycle of operations.

As already pointed out, it will be understood that the operation of the case or carton filling machine, in accordance with the previous practice, consists in assembling on the shelves 1 in the path of the plunger 2, a suitable charge of cans or packages which may fill either the entire case or comprise one or more layers therein. This is accomplished, in accordance with the established practice, by rolling the cans or packages down the ways 5 onto the shelves 1, which, in passing to the shelves travel across the gates 6. When the load is complete and the plunger is about to advance, these gates 6 are raised by swinging upwardly about the pivots 97 as just described, the gates being operated simultaneously through and by means of connecting rods 95 and 96, the latter being, in the form of the invention shown, drawn upwardly by the gate actuating lever 99 actuated by the cam 102.

As soon as the load is formed and separated the plunger may be advanced. In the preferred form of the invention shown, the operation is initiated by the operator, but it may be otherwise timed within the scope of the invention. For this purpose the latch 70 which engages pin 23 on lever 59, holds the lever 59 in the position shown in Figure 6, in which the bolt 47 is withdrawn against the pressure of the spring 51, permitting the clutch member 28 to rotate freely of the clutch member 29, is released by the pressure of the foot on the pedal 72. The cam end 61 of the lever 59 is withdrawn upwardly from the groove 62 by the action of the spring 68 permitting the bolt to advance and the clutch to engage. The connecting rod pin 36 being carried on the special link 35 of the chain 34, which is thus set in motion, travels around the path of the chain, giving it, in effect, a reciprocating motion which advances the plunger 2, transferring the charge from the shelves 1 to the carton and then retracts the plunger. At the end of the complete traverse the cam 81 engages the follower pin 90 on the lever 59, throwing the cam end 61 of said lever into the slot 62, withdrawing the bolt 47 and the stop 86 engages the pin 88, stopping the mechanism in a predetermined position.

It will thus be seen that the mechanism being in every instance stopped with the plunger withdrawn, the mechanism is suitably timed without the intervention of the operator and the filling operation is accomplished with absolute uniformity and independently of the unavoidable variation of the power and speed which would be applied by the operator using a foot power or a hand power machine. Further, the tripping operation requires very slight effort and can be performed by the operator without fatigue through the period of a working day, or the machine may be tripped in any suitable manner.

I have thus described specifically and in detail a preferred embodiment of my invention in connection with a case filling machine to which it is applied, in order that the nature and manner of using and operating the same may be fully understood, however, the specific terms herein are used descriptively rather than in a limiting sense, the scope of the invention being defined in the claims.

What I claim as new and desire to secure by Letters Patent is:

1. In a case filling machine, load forming shelves, a plunger mounted to reciprocate transversely of the shelves, a runway for leading cans or packages to the shelves, an electric motor, a chain with sprockets actuating the chain to move on a path parallel to the path of the plunger, a connecting rod connected to the chain and to the plunger, a clutch and suitable connections connecting one sprocket to the motor to be driven thereby, means controlling the clutch to stop the chain with the plunger in a predetermined withdrawn position, means tending to normally engage the clutch, means disengaging the clutch near said predetermined position of the plunger, and means for withdrawing said disengaging means permitting the clutch to engage.

2. In a case filling machine, load forming shelves, a plunger mounted to reciprocate transversely of the shelves, a runway for leading cans or packages to the shelves, an electric motor, a chain with sprockets actuating the chain to move on a path parallel to the path of the plunger, a connecting rod connected to the chain and to the plunger, a clutch and suitable connections connecting one sprocket to the motor to be driven thereby, means controlling the clutch to stop the chain with the plunger in a predetermined withdrawn position, means tending to normally engage the clutch, means disengaging the clutch near said predetermined position of the plunger, and means within the control of the operator for withdrawing said disengaging means permitting the clutch to engage.

3. In a case filling machine, load forming shelves, a plunger mounted to reciprocate transversely of shelves, a runway for leading cans or packages to the shelves, an electric motor, a chain with sprockets actuating the chain to move on a path parallel to the path of the plunger, a connecting rod connected to the chain and to the plunger, a clutch and suitable connections connecting one sprocket to the motor to be driven thereby, means controlling the clutch to stop the chain with the plunger in a predetermined withdrawn position, means tending to normally engage the clutch, means disengaging the clutch near said predetermined position of the plunger, means for withdrawing said disengaging means permitting the clutch to engage, means for cutting off the load in the path of the plunger from the load on the ways and means connected to said clutch and timed thereby for operating said cut-off just prior to the advance of the plunger.

4. In a case filling machine, load forming shelves, a plunger mounted to reciprocate transversely of the shelves, a runway for leading cans or packages to the shelves, an electric motor, a chain with sprockets actuating the chain to move on a path parallel to the path of the plunger, a connecting rod connected to the chain and to the plunger, a clutch and suitable connections connecting one sprocket to the motor to be driven thereby, means controlling the clutch to stop the chain with the plunger in a predetermined withdrawn position, means tending to normally engage the clutch, means disengaging the clutch near said predetermined position of the plunger, means within the control of the operator for withdrawing said disengaging means permitting the clutch to engage, means for cutting off the load in the path of the plunger from the load on the ways, and means connected to said clutch and timed thereby for operating said cut-off just prior to the advance of the plunger.

5. In a case filling machine, load forming and supporting mechanism, a reciprocating plunger, a source of rotary motion, an endless belt operated thereby and means supporting the same to move in an elongated path, means including a member carried by the belt connecting the plunger to the belt to reciprocate the plunger, means for connecting the belt to the source of power at the beginning of each stroke of the plunger and for disconnecting the belt at the end of each stroke.

6. In a case filling machine, load forming and supporting mechanism, a reciprocating plunger, a source of rotary motion, an endless belt moving on an elongated path in the general direction of the plunger motion operated thereby, means including a member carried by the belt connecting the plunger to the belt to reciprocate the plunger, means for connecting the belt to the source of power at the beginning of each stroke of the plunger and for disconnecting the belt at the end of each stroke.

7. In a case filling machine, load forming and supporting mechanism for cans and the like comprising a plurality of can shelves ways for feeding the cans to the shelves and separating mechanism for cutting off the load from the cans on the ways, a reciprocating plunger adapted to engage the cans on each shelf and to advance through the load forming mechanism moving the load ahead of it transversely to the direction of the ways, a source of rotary motion, an endless belt operated thereby, means connecting the plunger to the belt to reciprocate the plunger, means for connecting the belt to the source of power at the beginning of each stroke of the plunger and means timed to disconnect the belt at the end of each stroke, and means for stopping the plunger in withdrawn position.

8. In a case filling machine, load forming and supporting mechanism for cans and the like comprising a plurality of can shelves ways for feeding the cans to the shelves and separating mechanism for cutting off the load from the cans on the ways, a reciprocating plunger adapted to engage the cans on each shelf and to advance through the load forming mechanism moving the load ahead of it transversely to the direction of the ways, a source of rotary motion, an endless belt operated thereby, means connecting the plunger to the belt to reciprocate the plungers, means within the control of the operator for connecting the belt to the source of power at the beginning of each stroke of the plunger and for disconnecting the belt, the same being timed to operate at the end of each stroke.

9. In a case filling machine, load forming and supporting mechanism for cans and the like comprising a plurality of can shelves ways for feeding the cans to the shelves and separating mechanism for cutting off the load from the cans on the ways, a reciprocating plunger adapted to engage the cans on each shelf and to advance through the load forming mechanism moving the load ahead of it transversely to the direction of the ways, a source of rotary motion, an endless belt operated thereby moving in the general direction of the plunger motion, means connecting the plunger to the belt to reciprocate the plunger, means within the control of the operator for connecting the belt to the source of power at the beginning of each stroke of the plunger and for disconnecting the belt, the same being timed to operate at the end of each stroke.

10. In a case filling machine, load forming and supporting mechanism, a reciprocating plunger, a source of rotary motion, an endless belt operated thereby, means connecting the plunger to the belt to reciprocate the plunger, means for connecting the belt to the source of power at the beginning of each stroke of the plunger and for disconnecting the belt at the end of each stroke, and means also operated by the belt for separating the cans being supplied from the cans forming the load.

11. In a case filling machine, load forming and supporting mechanism, a reciprocating plunger, a source of rotary motion, an endless belt operated thereby, means connecting the plunger to the belt to reciprocate the plunger, means within the control of the operator for connecting the belt to the source of power at the beginning of each stroke of the plunger and for disconnecting the belt, the same being timed to operate at the end of each stroke, and means also operated by the belt for separating the cans being supplied from the cans forming the load.

12. A case filling machine comprising load forming shelves, ways for leading the cans to the shelves, a reciprocating plunger for moving the load from the shelves to fill the case, means for operating the plunger from a source of high speed rotary motion comprising a positively driven belt, means connecting the belt to the plunger to operate the same, a clutch included in said connections, means controlling the clutch comprising a cam member, means tending to remove the cam member from operative relation with the clutch, positive means timed to operate at the end of the stroke of the plunger to throw the cam member into engagement with the clutch, means for locking the cam member in said operative position to release the clutch, and tripping means for releasing said lock to move the cam into inoperative position.

13. A case filling machine comprising load forming shelves, ways for leading the cans to the shelves, a reciprocating plunger for moving the load from the shelves to fill the case, means for operating the plunger from a source of high speed rotary motion comprising a positively driven belt, means connecting the belt to the plunger to operate the plunger, a clutch included in said connections, means controlling the clutch comprising a cam member, means tending to remove the cam member from operative relation with the clutch, positive means timed to operate at the end of the plunger stroke to throw the cam member into engagement with the clutch, means for locking the cam member in said operative position to release the clutch, and tripping means for releasing said lock to move the cam into inoperative position, means for separating the supply of cans from the load and means for operating said separating means from said belt.

14. A case filling machine comprising load forming shelves, ways for leading the cans to the shelves, a reciprocating plunger for moving the load from the shelves to fill the case, means for operating the plunger from a source of high speed rotary motion comprising a positively driven belt, means connecting the belt to the plunger to operate the plunger, a clutch included in said connections, means controlling the clutch comprising a cam member, means tending to remove the cam member from operative relation with the clutch, positive means timed to operate at the end of the plunger stroke to throw the cam member into engagement with the clutch, means for locking the cam member in said operative position to release the clutch, and tripping means for releasing said lock to move the cam into inoperative position, means for separating the supply of cans from the load and means for operating said separating means comprising a cam driven through said clutch and means operated by the cam for actuating the gates.

15. The combination in a case filling machine of load supporting shelves, a reciprocating plunger for moving the load from the shelves into a case, ways for supplying the cans to the shelves, a source of high speed rotary motion, a positively operated belt moving on a path substantially parallel to the path of the plunger, means connecting the belt to the plunger to reciprocate the plunger, means connecting the belt to the rotary motion, said latter connecting means including a clutch comprising a continuously rotating member and a periodically rotating member, a sliding bolt for connecting one clutch member to the other, an intermediately pivoted cam lever having a cam end which swings into and out of the path of the bolt, which has a surface cooperating with the cam to withdraw the bolt, means connected to the lever tending to withdraw the cam from operative position in relation to the bolt, positive means timed to operate at the end of the plunger stroke for moving the cam into operative relation with the bolt at the end of the plunger stroke, means locking the cam in said position in which the bolt is withdrawn thereby, means within the control of the operator for releasing the lock and means tending to operate the lock when the cam is moved to operative position.

16. The combination in a case filling machine of load supporting shelves, a reciprocating plunger for moving the load from the shelves into a case, ways for supplying the cans to the shelves, a source of high speed rotary motion, a positively operated belt moving on a path substantially parallel to the path of the plunger, means connecting the belt to the plunger to reciprocate the plunger, means for connecting the belt to said source of rotary motion, said connecting means including a clutch comprising a continuously rotating member and a periodically rotating member, a sliding bolt for connecting one clutch member to the other, an intermediately pivoted cam lever having a cam end which swings into and out of the path of the bolt, which bolt has a surface cooperating with the cam to withdraw the cam from operative position in relation to the bolt, positive means timed to operate at the end of the plunger stroke for moving the cam into operative relation with the bolt, means locking the cam in said position in which the bolt is withdrawn thereby, means within the control of the operator for releasing the lock and means tending to operate the lock when the cam is moving to operative position, means for separating the cans on the ways from the load, means for operating said separator means comprising a cam lever and a cam operated through said clutch to swing the lever and separate the load prior to the operation of the plunger.

17. The combination in a case filling machine of load supporting shelves, a reciprocating plunger for moving the load from the shelves into a case, ways for supplying the cans to the shelves, a source of high speed rotary motion, a positively operated belt moving on a path substantially parallel to the path of the plunger, means connecting the plunger to the belt to reciprocate the plunger, means connecting the belt to the source of rotary motion, said latter connecting means including a clutch comprising a continuously rotating member and a periodically rotating member, a sliding bolt for connecting one to the other, an intermediately pivoted cam lever having a cam end which swings into and out of the path of the bolt, said bolt having a surface cooperating with the cam to withdraw the bolt, means connected to the lever tending to withdraw the cam from operative position in relation to the bolt, positive means for moving the cam into operative relation with the bolt, means locking the cam in said position in which the bolt is withdrawn thereby, means within the control of the operator for releasing the lock and means tending to operate the lock whenever the cam is moving to operative position, the periodic clutch being timed to release the belt from the drive at the end of each operation of the plunger, and a stop for positioning the plunger at the end of each operation.

18. In a case filling machine for cans and packages, load forming shelves and chutes for feeding the cans to the shelves, a plunger adapted to cooperate with each shelf and pass through the load forming mechanism, an endless chain positively connected to said plunger to operate the same, automatic means timed to cooperate with the plunger for cutting off the load from the cans in the chutes, a single revolution clutch and means adapted to be tripped by the operator for controlling the engagement of the same and driving means connected to said chain by said clutch.

Signed by me at Baltimore, Maryland, this 2nd day of July, 1928.

CHARLES H. WILD.